United States Patent [19]

Sedlak

[11] 4,015,363
[45] Apr. 5, 1977

[54] FISHING LURE
[75] Inventor: Joseph Sedlak, Clifton, N.J.
[73] Assignee: Lawrence Peska Associates, Inc., New York, N.Y.; a part interest
[22] Filed: Jan. 19, 1976
[21] Appl. No.: 650,023
[52] U.S. Cl. .............................. 43/42.22; 43/42.28; 43/42.36
[51] Int. Cl.² ........................................ A01K 85/00
[58] Field of Search ........... 43/42.22, 42.23, 42.28, 43/42.36, 42.31, 42.1, 42.06, 42.35

[56] References Cited
UNITED STATES PATENTS

| | | | |
|---|---|---|---|
| 1,878,015 | 9/1932 | Steffensen | 43/42.23 |
| 3,012,356 | 12/1961 | Tyson | 43/42.36 |
| 3,151,413 | 10/1964 | Witz | 43/42.1 |

Primary Examiner—Warner H. Camp

[57] ABSTRACT

A buoyant metal cylinder one end of which is domed, the other end of which tapers towards the longitudinal axis of the cylinder and has a fish hook extending therefrom surrounded by a skirt or feather cluster. Eyelets are provided in the center of the dome and on the cylinder wall between the center of the cylinder and the dome. The buoyancy of the fishing lure is adjusted by the addition of weights to the interior of the cylinder.

5 Claims, 3 Drawing Figures

FISHING LURE

SUMMARY OF THE INVENTION

The present invention relates to a fishing lure comprising a fish hook mounted in a buoyant metal cylinder, the cylinder having eyelet members for securing fishing line thereto, the eyelets being mounted in the cylinder forward of the hook, a skirt also being provided which surrounds the hook. The buoyancy of the cylinder and fishing lure may be adjusted by the placement of weights such as shot in the cylinder.

The cylinder in one embodiment is streamlined and has a domed end and at the opposite end the cylinder slopes inwardly from the cylinder wall towards the longitudinal axis of the cylinder and then continues in a direction parallel to such axis. The fish hook extends outwardly from the aforementioned sloping end. One line eyelet is mounted in the center of the dome and another eyelet or a plurality of eyelets is mounted between the dome and the center of the cylinder on the cylinder wall.

The weight in the cylinder may be adjusted to increase or decrease the buoyancy of the fishing lure for surface fishing or trolling.

The skirt is attached to the cylinder by a collar which clampingly secures the skirt to the end of the cylinder that slopes downwardly and parallel to the longitudinal axis of the cylinder. A shank extension is in the cylinder, the extension secured to the hook at one end and the eyelet members at the other end. Alternately, the shank extension projects through the cylinder and terminates in one of the eyelet members.

DETAILED DESCRIPTION

It is an object of the present invention to provide a novel and inexpensive fishing lure made from materials that are readily available in industry;

It is a further object of the present invention to provide a novel fishing lure whose buoyancy and weight may be adjusted to surface fishing, trolling and surfcasting.

Fishing lures of the prior art having weights therein to adjust the buoyancy are disclosed in U.S. Pat. Nos. 3,613,290 Louthan; and 1,313,567 Ulrich. U.S. Pat. No. 2,600,002 Klein discloses a sinker having a plurality of weights which may be added to decrease the buoyancy thereof. Other references disclosing fishing lures comprise U.S. Pat. Nos. 3,359,674 Strumor; 2,983,065 Ferguson et al; 2,738,610 Rice; 2,288,595 Peterson; and, 1,993,798 Peterson.

None of the foregoing references disclose a method of using readily available materials for the manufacture of a fishing lure, especially a fish lure the buoyancy of which may be adjusted and which has a streamlined shape. These and other difficulties have been overcome by the present invention and will become apparent from the disclosure and claims that follow as well as the appended drawing.

Figure 1:
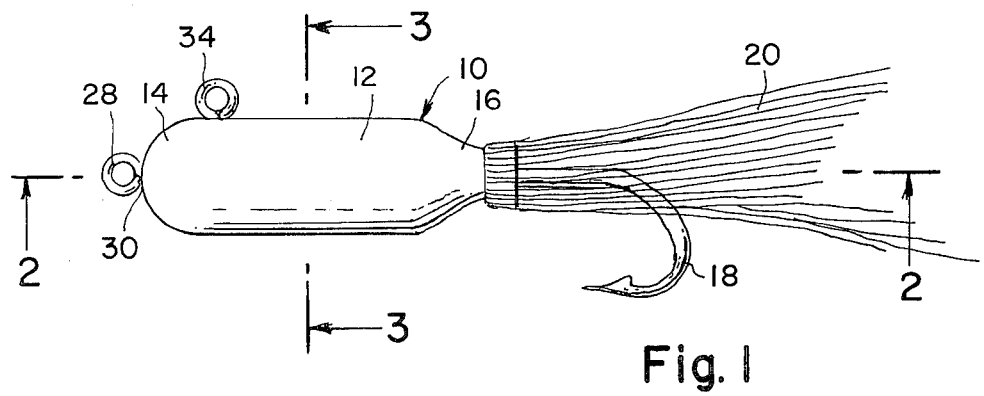
FIG. 1 is a side elevation illustrating a fishing lure comprising a metal cylinder, hook and skirt surrounding the hook according to one embodiment of the present invention.
Figure 2:
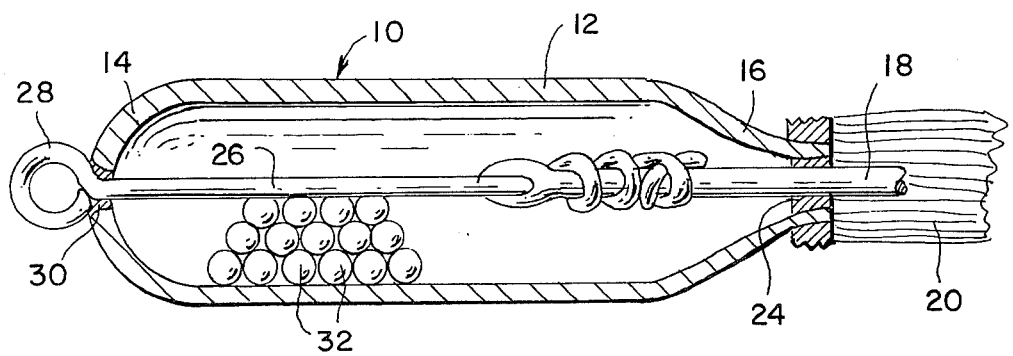
FIG. 2 is a plan view in section taken along the line 2—2 from FIG. 1.
Figure 3:
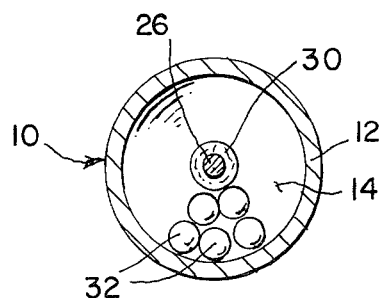
FIG. 3 is a front elevation in section taken along the line 3—3 of FIG. 1.

Referring to the drawing and FIGS. 1 through 3, a fishing lure 10 is illustrated comprising a carbon dioxide cartridge or similar small scale gas cylinder known in the art. The cylinder 12 has a domed end 14 and the opposite end 16 slopes towards the longitudinal axis of the cylinder and then parallel to such axis. A hook 18 extends outwardly from the end 16 of the cylinder, hook 18 being surrounded by a skirt 20 such as a cluster of feathers or a buck tail clampingly secured to the end 16. A solder seal 24 is provided in the end 16 to prevent water from leaking into the cylinder, the hook 18 having a shank extension comprising a copper wire 26 secured thereto and projecting out of the domed end 14 of the cylinder through an opening sealed with solder 30 and terminating in an eyelet 28. Another eyelet 34 is provided intermediate the center of the cylinder, i.e., that portion of the cylinder taken along the line 3—3 in FIG. 1 and the domed end 14 thereof. Weight such as BB shot 32 may be added to the cylinder to decrease the buoyancy.

In use, a fishing lure may be secured to eyelet 28 or 34, eyelet 28 being used for surface fishing and eyelet 34 being used for trolling. The weight or BB shot 32 may be adjusted to increase or decrease the buoyancy of lure 10. The shot 32 may be also added to increase the weight of the lure 10 to make it more suitable for surf casting where heavier lures are required because of winds and ocean currents encountered in this type of fishing.

Although the invention has been described by reference to some embodiments, it is not intended that the novel fishing lure be limited thereby but that certain modifications thereof are intended to be included as falling within the broad scope and spirit of the foregoing disclosure, the following claims and the appended drawings.

What is claimed is:

1. A fishing lure comprising fish hook means mounted in a buoyant metal cylinder means, eyelet means for securing fishing line to said cylinder, said eyelet means mounted in said cylinder forward of said hook, skirt means surrounding said hook, buoyancy adjusting means in said cylinder, said cylinder being streamlined and having a domed end and at the opposite end from said domed end, said cylinder slopes inwardly from the main cylinder wall towards the longitudinal axis of said cylinder and then parallel to such axis, said fish hook extending outwardly from said sloping end, said eyelet means comprising first eyelet means mounted in the center of said dome and second eyelet means mounted between said dome and the center of said cylinder on the cylinder wall.

2. The fishing lure of claim 1 where said buoyancy adjusting means comprises weight means which are adjustable to increase and decrease the buoyancy of said fishing lure for surface fishing and trolling.

3. The fishing lure of claim 1 where said skirt is attached to said cylinder by collar means clampingly securing said skirt to said end of said cylinder sloping inwardly and parallel to the longitudinal axis of said cylinder.

4. The fishing lure of claim 3 where said hook means comprises a shank extension in said cylinder, said extension secured to said hook at one end of said extension and said eyelet means at the other end.

5. The fishing lure of claim 4 where said shank extension projects through said cylinder and terminates in one of said eyelet means.

* * * * *